C. F. LIVINGSTON AND E. E. LORDGE.
AUTOMOBILE SIGNAL.
APPLICATION FILED NOV. 11, 1919.

1,353,253.

Patented Sept. 21, 1920.

INVENTORS
Charles F. Livingston
Edward E. Lordge
BY John A. Naismith
THEIR ATTORNEY

UNITED STATES PATENT OFFICE.

CHARLES F. LIVINGSTON AND EDWARD E. LORDGE, OF SAN JOSE, CALIFORNIA.

AUTOMOBILE-SIGNAL.

1,353,253.  Specification of Letters Patent.  Patented Sept. 21, 1920.

Application filed November 11, 1919. Serial No. 337,247.

*To all whom it may concern:*

Be it known that we, CHARLES F. LIVINGSTON and EDWARD E. LORDGE, citizens of the United States, and residents, respectively, of San Jose, in the county of Santa Clara and State of California, have invented certain new and useful Improvements in Automobile-Signals, of which the following is a specification.

Our invention relates to a device whereby a suitable warning signal may be flashed from one vehicle to another vehicle whereby the latter may be advised as to the contemplated action of the former.

It is an object of our invention to provide a device of the character indicated that will be simple in form, construction and operation and practical and efficient in application. A further object is to provide an attachment for automobile look-back mirrors whereby the said mirrors may be utilized for the purpose specified thereby securing a satisfactory and positive signal with a minimum of mechanical complication and without adding materially to the visible mechanism on a machine.

Figure 1:
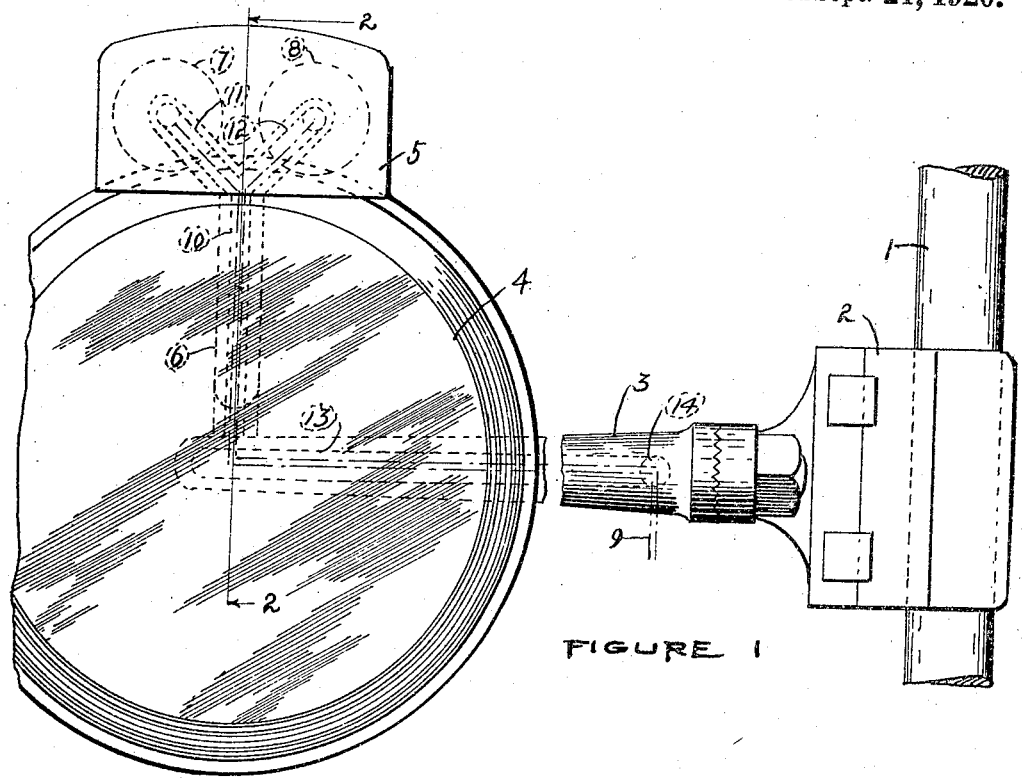
Figure 1 is an elevation of the device in position, parts being broken away.
Figure 2:
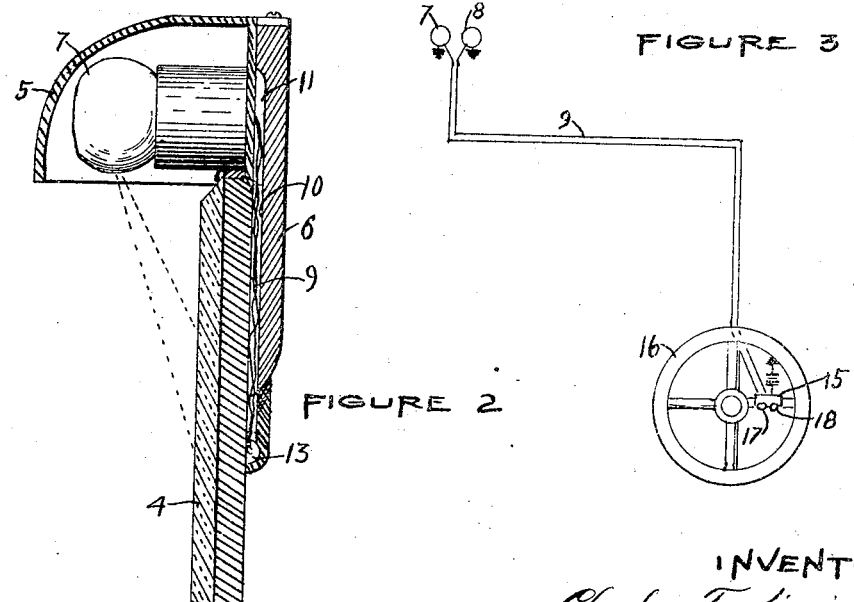
Fig. 2 is a sectional view on line 2—2 of Fig. 1.
Figure 3:
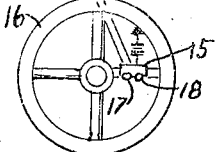
Fig. 3 is a diagrammatical illustration of the wiring system of the device.

Referring more particularly to the drawing, 1 indicates a portion of one of the vertical members of the framework of an automobile top, to which is firmly secured an arm 3 by means of clamp 2, the arm 3 supporting mirror 4 in the well known manner. Supported upon the upper edge of mirror 4 and extending a distance over the front thereof is a hood 5 secured thereto by a supporting member 6 as shown. Within hood 5 are mounted a pair of electric light bulbs as 7 and 8 respectively operatively positioned in an electric light circuit 9. The wires forming a portion of the circuit 9 are carried to bulbs 7 and 8 through conduits 10, 11 and 12 formed in supporting member 6, and conduit 13 in arm 3, thence out through orifice 14 in arm 3 to a switch 15 mounted upon the steering wheel 16 so that either bulb 7 or 8 may be lighted at will. These bulbs 7 and 8 are tinted different colors, as red and green respectively, and the buttons of switch 15 indicated at 17 and 18, are colored red and green respectively to correspond with the bulbs operated by them.

If button 17 is pressed, then bulb 7 is lighted and the red light emitted thereby, being shielded from direct observation by hood 5, is thrown downwardly upon mirror 4 so that anyone who can see the mirror is warned that the vehicle is about to stop. If the button 18 is pressed then a green light is thrown upon the mirror and observers thereof are warned that the vehicle is about to turn in one direction or the other. The effect in either case is to display a clear, luminous signal of sufficient size and carrying power as to be readily distinguished at a distance, and this without adding any substantial amount of equipment to the automobile.

It is understood of course that any number of bulbs may be used and of any desired assortment of colors, and that any suitable type of switch mechanism may be used. It is further understood that changes in form, construction, operation and general arrangement of parts, members and features may be made within the scope of the appended claim.

We claim:

The combination with a look-back mirror for automobiles, of a hood mounted upon the edge thereof and extending a distance over the front thereof, a pair of illuminating units of different colors mounted in an electric circuit and positioned under said hood whereby the light emitted therefrom is concentrated on said mirror, and means for rendering either unit operative or inoperative.

CHARLES F. LIVINGSTON,
EDWARD E. LORDGE,